US012254888B2

(12) United States Patent
Kracun et al.

(10) Patent No.: US 12,254,888 B2
(45) Date of Patent: Mar. 18, 2025

(54) MULTI-FACTOR AUDIO WATERMARKING

(71) Applicant: GOOGLE LLC, Mountain View, CA (US)

(72) Inventors: Aleks Kracun, New York, NY (US); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/373,244

(22) Filed: Sep. 26, 2023

(65) Prior Publication Data
US 2024/0021207 A1    Jan. 18, 2024

Related U.S. Application Data

(63) Continuation of application No. 17/114,118, filed on Dec. 7, 2020, now Pat. No. 11,776,549.
(Continued)

(51) Int. Cl.
*G10L 17/00* (2013.01)
*G10L 17/02* (2013.01)
(Continued)

(52) U.S. Cl.
CPC .............. *G10L 17/22* (2013.01); *G10L 17/02* (2013.01); *G10L 17/06* (2013.01); *G10L 25/51* (2013.01)

(58) Field of Classification Search
CPC ......... G10L 17/22; G10L 17/02; G10L 17/06; G10L 25/51; G10L 15/22; G10L 15/16; G10L 17/00; G10L 19/018
See application file for complete search history.

(56) References Cited

U.S. PATENT DOCUMENTS 9,548,053 B1 * 1/2017 Basye ..................... G10L 15/22
10,276,175 B1 * 4/2019 Garcia .................. G10L 19/018
(Continued)

FOREIGN PATENT DOCUMENTS

WO    2020005202    1/2020

OTHER PUBLICATIONS

Bar-Yossef, et al.; Approximating edit distance efficiently; 45th Annual IEEE Symposium on Foundations of Computer Science; pp. 1-10; dated 2004.
(Continued)

*Primary Examiner* — Douglas Godbold
*Assistant Examiner* — Parker Mayfield
(74) *Attorney, Agent, or Firm* — Gray Ice Higdon

(57) ABSTRACT

Techniques are described herein for multi-factor audio watermarking. A method includes: receiving audio data; processing the audio data to generate predicted output that indicates a probability of one or more hotwords being present in the audio data; determining that the predicted output satisfies a threshold that is indicative of the one or more hotwords being present in the audio data; in response to determining that the predicted output satisfies the threshold, processing the audio data using automatic speech recognition to generate a speech transcription feature; detecting a watermark that is embedded in the audio data; and in response to detecting the watermark: determining that the speech transcription feature corresponds to one of a plurality of stored speech transcription features; and in response to determining that the speech transcription feature corresponds to one of the plurality of stored speech transcription features, suppressing processing of a query included in the audio data.

14 Claims, 6 Drawing Sheets

Related U.S. Application Data

(60) Provisional application No. 63/110,959, filed on Nov. 6, 2020.

(51) Int. Cl.
    *G10L 17/06*     (2013.01)
    *G10L 17/22*     (2013.01)
    *G10L 25/51*     (2013.01)

(56) References Cited

U.S. PATENT DOCUMENTS

| | | | |
|---|---|---|---|
| 11,100,930 B1* | 8/2021 | Salem | G10L 15/08 |
| 11,244,693 B2* | 2/2022 | Chauhan | G06F 21/10 |
| 2007/0033026 A1* | 2/2007 | Bartosik | G10L 15/26 704/E15.04 |
| 2016/0077794 A1* | 3/2016 | Kim | G10L 15/20 704/275 |
| 2018/0130469 A1* | 5/2018 | Gruenstein | G10L 15/30 |
| 2018/0350356 A1 | 12/2018 | Garcia | |
| 2019/0362719 A1 | 11/2019 | Gruenstein et al. | |
| 2020/0098380 A1* | 3/2020 | Tai | G10L 13/08 |
| 2021/0090575 A1 | 3/2021 | Mahmood et al. | |
| 2022/0148601 A1 | 5/2022 | Kracun et al. | |

OTHER PUBLICATIONS

Intellectual Property India; Examination Report issued in Application No. 202227062338; 8 pages; dated Jul. 27, 2023.

European Patent Office; International Search Report and Written Opinion issued in Application No. PCT/US2021/058315; 13 pages; dated Mar. 10, 2022.

Tai, Y.Y. and Mansour, M.F. "Audio Watermarking Over the Air with Modulated Self-Correlation". Amazon Inc., USA; arXiv:1903.08238v1 [cs.MM] Mar. 19, 2019; 5 pages.

European Patent Office, Intention to Grant issued in Application No. 21816268.3; 50 pages; dated Aug. 16, 2024.

* cited by examiner

MULTI-FACTOR AUDIO WATERMARKING

BACKGROUND

Humans can engage in human-to-computer dialogs with interactive software applications referred to herein as "automated assistants" (also referred to as "digital agents", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). Other hotwords (e.g., "No", "Stop", "Cancel", "Volume Up", "Volume Down", "Next Track", "Previous Track", etc.) may be mapped to various commands, and when the predicted output indicates that one of these hotwords is present, the mapped command may be processed by the client device. However, when predicted output indicates that a hotword is not present, corresponding audio data will be discarded without any further processing, thereby conserving resources and user privacy.

The above-mentioned and/or other machine learning models (e.g., additional machine learning models described below), whose predicted output dictates whether automated assistant function(s) are activated, perform well in many situations. However, in certain situations, the audio data processed by the automated assistant may include, in addition to utterances spoken by users, audio from television commercials, television shows, movies, and/or other media content. In the case where the audio data processed by the automated assistant includes audio from media content, when one or more hotwords are present in the audio from the media content, the hotword detection model of the automated assistant may detect the one or more hotwords from the media content. The automated assistant may then process any audio from the media content that follows within a threshold amount of time of the one or more hotwords and respond to a request in the media content. Alternatively, the automated assistant may perform one or more action(s) (e.g., increasing or decreasing audio volume) corresponding to the detected hotword(s).

The activation of the automated assistant based upon one or more hotwords present in audio from television commercials, television shows, movies, and/or other media content may be unintended by the user and may lead to a negative user experience (e.g., the automated assistant may respond even though the user did not make a request and/or perform actions that the user does not wish to be performed). Occurrences of unintended activations of the automated assistant can waste network and/or computational resources and potentially force the human to make a request for the automated assistant to undo or cancel an undesired action (e.g., the user may issue a "Volume Down" command to counteract an unintended "Volume Up" command present in media content that triggered the automated assistant to increase a volume level).

SUMMARY

Some implementations disclosed herein are directed to improving performance of machine learning model(s) through multi-factor audio watermarking. As described in more detail herein, such machine learning models can include, for example, hotword detection models and/or other machine learning models. Various implementations combine audio watermarks with additional factors (e.g., speech-based signals) to detect media content. In response to detecting media content, the system can suppress processing of a query included in audio data of the media content, thereby reducing occurrences of unintended activations of the automated assistant. In other implementations, in response to detecting media content, the system can adapt hotword detection and/or automatic speech recognition.

In some implementations, the audio watermark may be an audio signal, imperceptible to humans, that is embedded into a piece of audio content. In some implementations, by combining detection of audio watermarks with additional factors, the misuse of watermarks (e.g., to disable an automated assistant throughout the playback of a piece of content) may be reduced. Additionally, by combining detection of audio watermarks with additional factors, media content may be reliably detected even when an on-device or cloud database of audio fingerprints for known pieces of media content is unavailable or impractical to maintain (e.g., because the media content is too new or because the volume of media content is too great to be included in such a database).

In some implementations, an audio watermarking system performs an offline preprocessing step to modify the audio track of some pre-recorded content (media) in a manner that is imperceptible to a human listener. A corresponding process is used on an automated assistant enabled device to detect the presence of a specific watermark, or one of the watermarks in a known set, and suppress processing of a query or action that would otherwise be triggered by a hotword that accompanies the watermark in the audio track. In some implementations, the watermark may be positioned prior to, concurrent with, or subsequent to the hotword (and/or query associated with the hotword) in the audio track of the media content.

In some implementations, the system reduces a risk of misuse of audio watermarks (e.g., disabling an automated assistant throughout the playback of a piece of content, instead of only during playback of a hotword present in the audio track of the content) by a malicious entity by combining audio watermark detection with one or more additional factors. In some implementations, the system may automatically learn the additional factors on the fly.

In other implementations, the system may use a watermark to trigger an adaptation of the behavior of any speech system which runs in parallel. In an example, in response to detecting a watermark, the system may trigger a temporary reduction of the hotword threshold if it seems likely that a user will want to issue a query while particular media content is being played.

In some implementations, the system combines detection of a watermark with satisfaction of one or more additional factors (e.g., matching a speech transcription with an expected set of fuzzy speech transcriptions, matching a speaker identification vector with a set of expected speaker identification vectors, and/or other signals). In response to both the detection of a watermark and the satisfaction of the one or more additional factors, the system may suppress processing of a query or action that would otherwise be triggered by a hotword that accompanies the watermark in the audio track. In some implementations, by combining the detection of a watermark with the satisfaction of the one or more additional factors, the system may reduce the risk of misuse of watermarks and limit the suppression of query processing to situations in which the watermark is detected in combination with a specific query or a similar sounding variant of that query. In some implementations, using a set of fuzzy speech transcriptions for matching with the speech transcription allows for errors and inexactitudes in the automatic speech recognition process.

In some implementations, in a watermark registration step, the system may insert an audio watermark into an audio track of media content. The audio watermark may be an audio signal, imperceptible to humans, that is embedded into the audio track of a piece of audio content. The audio watermark may be inserted at a particular temporal location in the audio track (e.g., prior to, concurrent with, or subsequent to a hotword and/or query associated with the hotword).

Additionally, during the watermark registration step, the system may extract one or more features from the audio track of the media content to be used at detection time. In some implementations, the extracted feature(s) may include the specific watermark that was embedded, which may be selected from a range of watermarks that are available to use. In some implementations, the extracted feature(s) may include a unique identifier used by the system to encode the watermark.

In some implementations, the feature(s) extracted during the watermark registration step may include the speech transcription at the point in the audio track where the watermark was inserted, along with potential alternative erroneous speech transcriptions, which may be limited by edit distance (or a phonetic algorithm) and may be derived from the top-N hypotheses from the speech recognition engine. For example, in some implementations, additional replicants of the sample audio with varying "noisification"/ spectral augmentation can be used to generate erroneous transcriptions that simulate what might be encountered at detection time in a real environment (e.g., various environmental noises). In another example, additional automatic speech recognition systems with different models and/or intentionally incorrect settings (e.g., incorrect localization, such as U.K. English instead of U.S. English) can be used to generate additional erroneous transcriptions, simulating behaviors that may be seen on client devices.

In some implementations, in addition to or instead of the above features, other features may be extracted during the watermark registration step, including the hotword activation threshold and timing relative to the watermark, an associated speaker identification d-vector, a voice activity detection (VAD) binary mask, an endpointer cutoff time, and/or a language identification (LangId) confusion matrix. In some implementations, in addition to or instead of the above features, time may be used as an additional feature, which may be used when anticipated future broadcast information for the media content is known. For example, a timestamp or window, and/or a location, metro area, and/or broadcaster from which the information may be inferred may be used.

In some implementations, some of all of the above features may be output from the watermarking process, pushed to client devices executing automated assistants which perform watermark detection, and stored locally on those client devices as factors for use in the watermark detection process. In other implementations, some of all of the above features may be output from the watermarking process, pushed to one or more cloud computing nodes, and stored by those cloud computing nodes as factors for use in the watermark detection process (e.g., by one or more cloud-based automated assistant components). In some implementations, a multi-factor watermark includes one or more specific watermark identifiers for which the client devices are looking, along with one or more of the other stored factors, which typically include an expected speech transcription, though this may be omitted.

In some implementations, in a multi-factor audio watermark detection step performed on a client device, audio watermark detection may be performed over a continuous stream of audio, or only in response to detecting a specific speech event such as a hotword. Once a known audio watermark is detected, the system may load the associated additional factors (which may be stored locally on the client device or on a cloud computing node, as described above) and extract features from the audio to compare against those additional factors. For example, in some implementations, inference for the additional factors may include running an automatic speech recognition engine to generate speech transcription features to compare against those stored as a second factor. These can be compared, e.g., using an edit distance or some other measure of phonetic or textual similarity. Multiple hypotheses may be considered. In other implementations, inference for the additional factors may include running a speaker ID model to validate the speaker of the query against the speaker ID vector that is stored, e.g., by performing an embedding distance comparison to make sure that the two are sufficiently similar. In other implementations, inference for the additional factors may include determining whether or not the current time and/or date fits within a window in which the watermark is known to be active.

In some implementations, an audio watermark that is detected by a client device may be validated by matching at least one other feature. In response to validating the watermark, the system may suppress processing of a query included in audio data. If a watermark that is detected cannot be validated by matching at least one other feature, the system may avoid suppressing processing of a query included in audio data, and the query may be processed in a typical manner. In such cases, the system may use federated analytics-based techniques to discover both unregistered uses of watermarks, and also misuses of watermarks. In some implementations, the feature extraction process described above can be performed at watermark detection time for an unknown watermark (e.g., a watermark that cannot be validated).

In some implementations, if the system determines watermarks that cannot be validated by matching at least one other feature are present, the system may extract one or more of the above-mentioned features (e.g., a speech transcription) and aggregate the features using a technique such as federated analytics. By performing this aggregation across multiple users and/or devices, the system can learn features on the fly for content with watermarks, which may then be stored and used to validate the watermark at future detection instances. In other implementations, the system may detect misuse of the watermarking system (e.g., based on a wide variety of speech transcriptions or other associated features).

In other implementations, a client device, in response to detecting and validating an audio watermark, may adapt speech processing following the detecting of the audio watermark. For example, a watermark could be placed in a piece of content and used to temporarily lower the hotword detection threshold to make an automated assistant more responsive to queries which would be expected alongside the content. More generally, the watermark can be used to adjust any speech parameter, e.g., biasing, language selection, etc. For example, when the media content is in a certain language, upon detection of the audio watermark, the system may bias towards that language choice since the system has a strong prior that subsequent queries would arrive in the same language. In this setting, the system may perform one or more of the following: The machine transcription features can generate lattice biasing instructions for guiding the automatic speech recognition to a particular transcript; the hotword threshold feature can generate instructions for increasing the threshold or reducing it; and/or the LangId confusion matrix can generate an instruction for which language-specific ASR system should be used both during factor generation and during detection.

In various implementations, a method implemented by one or more processors may include receiving, via one or more microphones of a client device, audio data that captures a spoken utterance; processing the audio data using one or more machine learning models to generate a predicted output that indicates a probability of one or more hotwords being present in the audio data; determining that the predicted output satisfies a threshold that is indicative of the one or more hotwords being present in the audio data; in response to determining that the predicted output satisfies the threshold, processing the audio data using automatic speech recognition to generate a speech transcription feature; detecting a watermark that is embedded in the audio data; and in response to detecting the watermark: determining that the speech transcription feature corresponds to one of a plurality of stored speech transcription features or intermediate embeddings; and in response to determining that the speech transcription feature corresponds to one of the plurality of stored speech transcription features or intermediate embeddings, suppressing processing of a query included in the audio data.

In some implementations, the detecting the watermark is in response to determining that the predicted output satisfies the threshold. In some implementations, the watermark is an audio watermark that is imperceptible to humans. In some implementations, and the plurality of stored speech transcription features or intermediate embeddings is stored on the client device.

In some implementations, determining that the speech transcription feature corresponds to one of the plurality of stored speech transcription features includes determining that an edit distance between the speech transcription feature and one of the plurality of stored speech transcription features satisfies a threshold edit distance. In some implementations, determining that the speech transcription feature corresponds to one of the plurality of stored speech transcription features includes determining that an embedding-based distance between the speech transcription feature and one of the plurality of stored speech transcription features satisfies a threshold embedding-based distance.

In some implementations, the method may further include, in response to detecting the watermark: using speaker identification on the audio data to determine a speaker vector corresponding to the query included in the audio data; and determining that the speaker vector corresponds to one of a plurality of stored speaker vectors. In some implementations, suppressing processing of the query included in the audio data is further in response to determining that the speaker vector corresponds to one of the plurality of stored speaker vectors.

In some implementations, the method may further include determining whether a current time or date is within an active window of the watermark, and suppressing processing of the query included in the audio data is further in response to determining that the current time or date is within the active window of the watermark. In some implementations, the plurality of stored speech transcription features or intermediate embeddings includes erroneous transcriptions.

In some additional or alternative implementations, a computer program product may include one or more computer-readable storage media having program instructions collectively stored on the one or more computer-readable storage media. The program instructions may be executable to: receive, via one or more microphones of a client device, first audio data that captures a first spoken utterance; process the first audio data using automatic speech recognition to generate a speech transcription feature or intermediate embedding; detect a watermark that is embedded in the first audio data; and in response to detecting the watermark: determine that the speech transcription feature or intermediate embedding corresponds to one of a plurality of stored speech transcription features or intermediate embeddings; and in response to determining that the speech transcription feature or intermediate embedding corresponds to one of the plurality of stored speech transcription features or intermediate embeddings, modify a threshold that is indicative of the one or more hotwords being present in audio data.

In some implementations, the program instructions are further executable to: receive, via the one or more microphones of the client device, second audio data that captures a second spoken utterance; process the second audio data using one or more machine learning models to generate a predicted output that indicates a probability of one or more hotwords being present in the second audio data; determine that the predicted output satisfies the modified threshold that is indicative of the one or more hotwords being present in the second audio data; and in response to determining that the predicted output satisfies the modified threshold, process a query included in the second audio data.

In some implementations, the program instructions are further executable to, in response to detecting the watermark: use speaker identification on the audio data to determine a speaker vector corresponding to the query included in the audio data; and determine that the speaker vector corresponds to one of a plurality of stored speaker vectors. In some implementations, modifying the threshold that is indicative of the one or more hotwords being present in audio data is further in response to determining that the speaker vector corresponds to one of the plurality of stored speaker vectors.

In some additional or alternative implementations, a system may include a processor, a computer-readable memory, one or more computer-readable storage media, and program instructions collectively stored on the one or more computer-readable storage media. The program instructions may be executable to: receive, via one or more microphones of a client device, audio data that captures a spoken utterance; process the audio data using one or more machine learning models to generate a predicted output that indicates a probability of one or more hotwords being present in the audio data; determine that the predicted output satisfies a threshold that is indicative of the one or more hotwords being present in the audio data; in response to determining that the predicted output satisfies the threshold, process the audio data using automatic speech recognition to generate a speech transcription feature or intermediate embedding; detect a watermark that is embedded in the audio data; and in response to detecting the watermark: determine that the speech transcription feature or intermediate embedding corresponds to one of a plurality of stored speech transcription features or intermediate embeddings; and in response to determining that the speech transcription feature or intermediate embedding corresponds to one of the plurality of stored speech transcription features or intermediate embeddings, suppress processing of a query included in the audio data.

Through utilization of one or more techniques described herein, occurrences of unintended activations of the automated assistant that can waste network and/or computational resources and potentially force the human to make a request for the automated assistant to undo an undesired action can be reduced. This results in improved performance by allowing an automated assistant to suppress processing of a query included in an audio track of media content.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
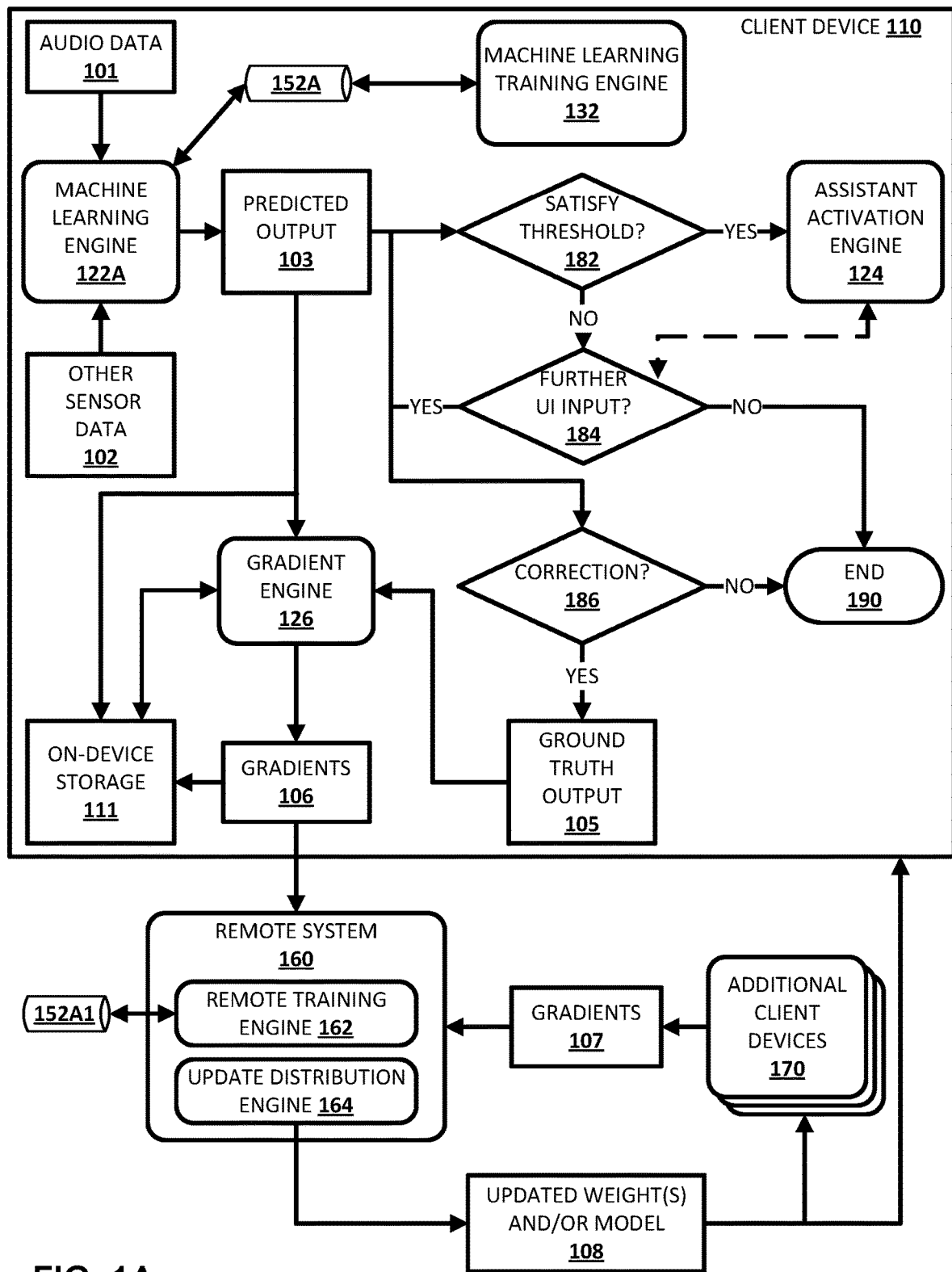
FIG. 1A and FIG. 1B depict example process flows that demonstrate various aspects of the present disclosure, in accordance with various implementations.
Figure 1B:
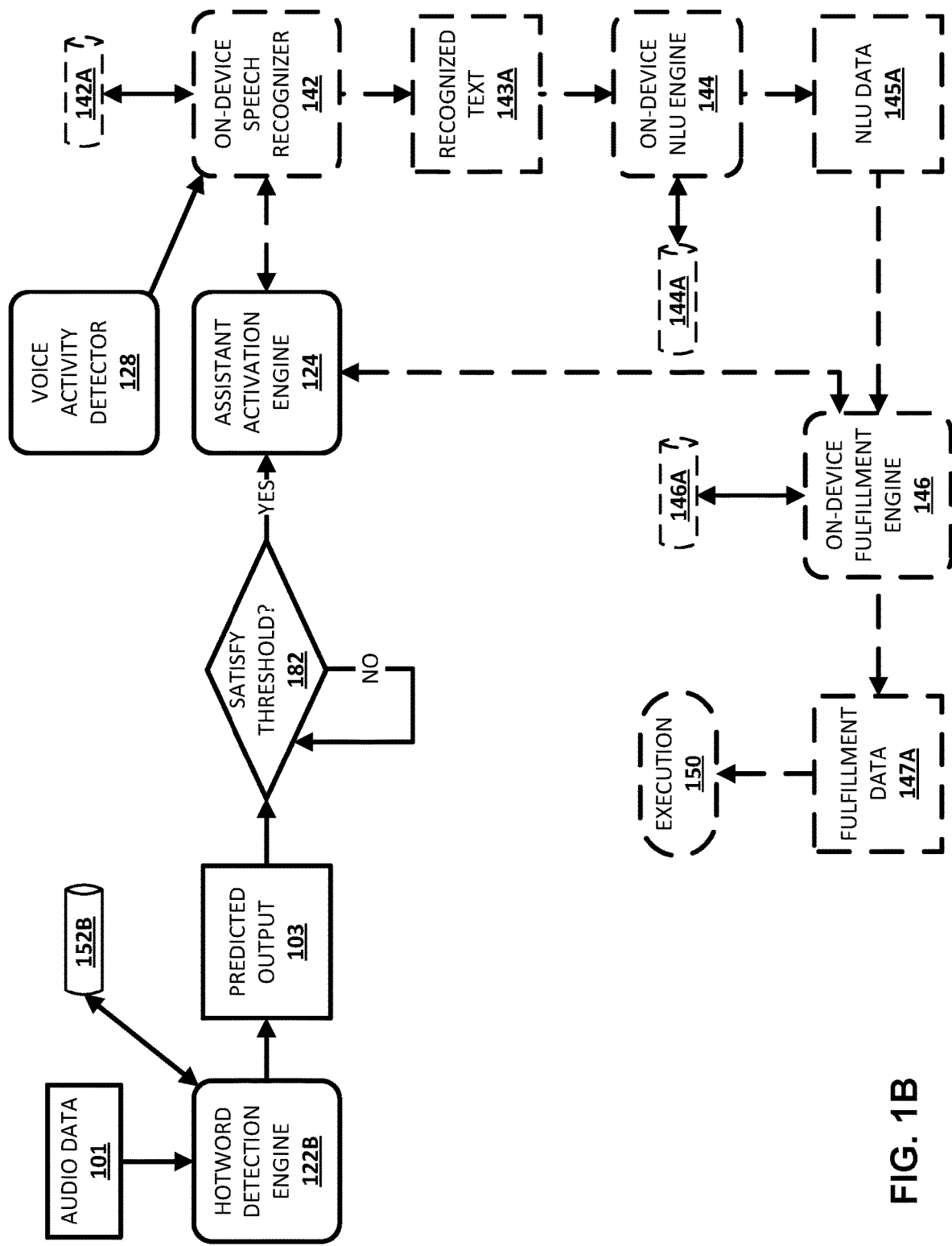

FIGS. 1A and 1B depict example process flows that demonstrate various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, a speech recognition (ASR) engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating gradients 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the audio data 101 (e.g., a common task such as changing the device volume). For example, assume the predicted output 103 is a probability (e.g., 0.80 or 0.90) and the threshold at block 182 is a threshold probability (e.g., 0.85). If the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", "Volume Up", "Volume Down", "Next Track", "Previous Track", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can end at block 190.

However, if the client device 110 determines there is further user interface input received at block 184, then the system can determine whether the further user interface input received at block 184 includes correction(s) at block 186 that contradict the decision made at block 182. If the client device 110 determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine ground truth output 105.

In some implementations, the gradient engine 126 can generate the gradients 106 based on the predicted output 103 to the ground truth output 105. For example, the gradient engine 126 can generate the gradients 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the predicted output 103 and the corresponding ground truth output 105 to generate the gradients 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradients 106 in real-time.

Moreover, the gradient engine 126 can provide the generated gradients 106 to on-device machine learning training engine 132. The on-device machine learning training engine 132, when it receives the gradients 106, uses the gradients 106 to update the on-device machine learning model 152A.

For example, the on-device machine learning training engine 132 can utilize backpropagation and/or other techniques to update the on-device machine learning model 152A. It is noted that, in some implementations, the on-device machine learning training engine 132 can utilize batch techniques to update the on-device machine learning model 152A based on the gradients 106 and additional gradients determined locally at the client device 110 on the basis of additional corrections.

Further, the client device 110 can transmit the generated gradients 106 to a remote system 160. When the remote system 160 receives the gradients 106, a remote training engine 162 of the remote system 160 uses the gradients 106, and additional gradients 107 from additional client devices 170, to update global weights of a global hotword model 152A1. The additional gradients 107 from the additional client devices 170 can each be generated based on the same or similar technique as described above with respect to the gradients 106 (but on the basis of locally identified failed hotword attempts that are particular to those client devices).

An update distribution engine 164 can, responsive to one or more conditions being satisfied, provide, to the client device 110 and/or other client device(s), the updated global weights and/or the updated global hotword model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global hotword model is provided to the client device 110, the client device 110 can replace the on-device machine learning model 152A with the updated global hotword model. In other implementations, the client device 110 may download a more suitable hotword model (or models) from a server based on the types of commands the user expects to speak and replace the on-device machine learning model 152A with the downloaded hotword model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region, device type, context (e.g., music playing), etc., and provided to client device 110 based on the client device 110 being primarily located in the particular geographic region.

Figure 2:
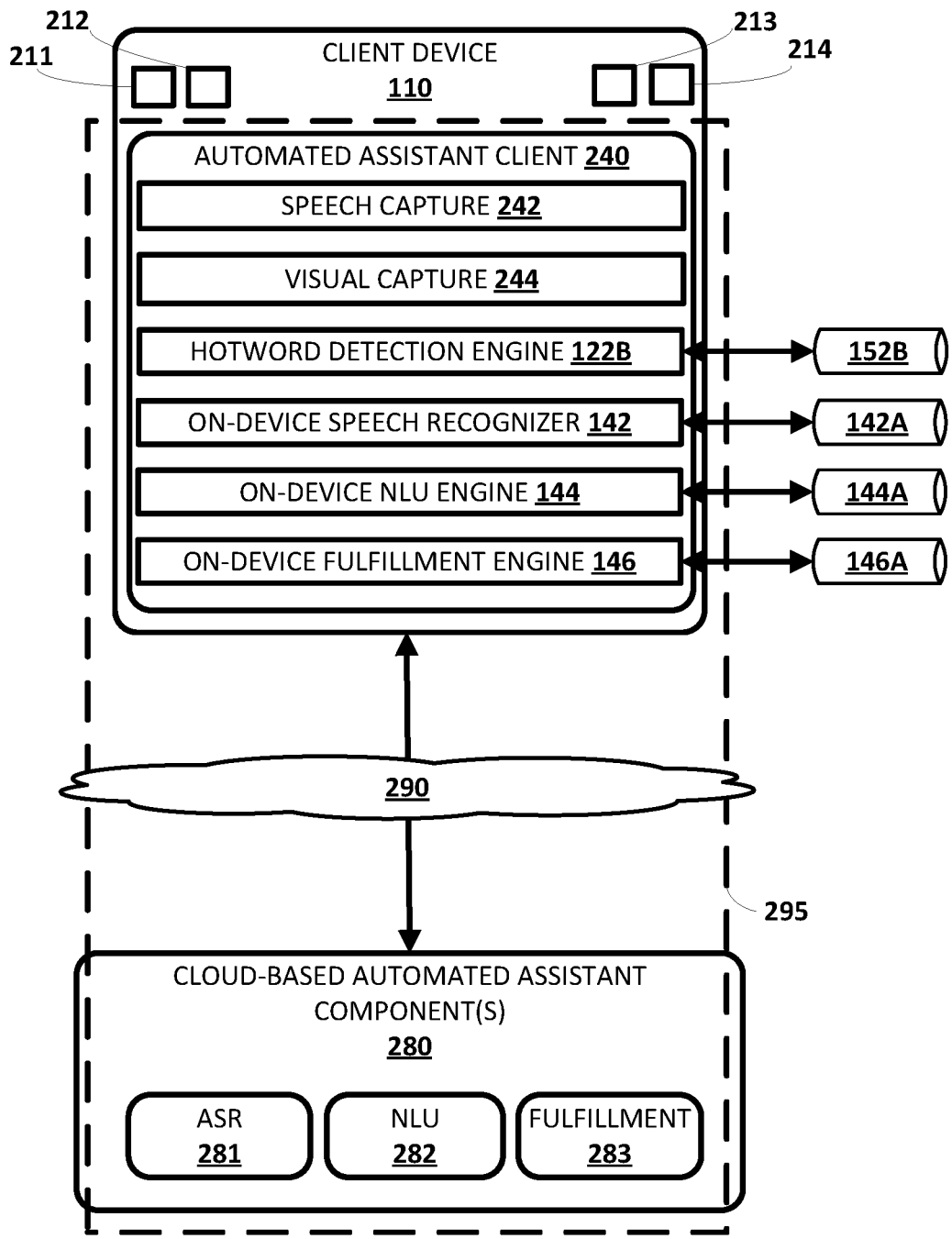
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) an automated assistant client 240. The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture a user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143B from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
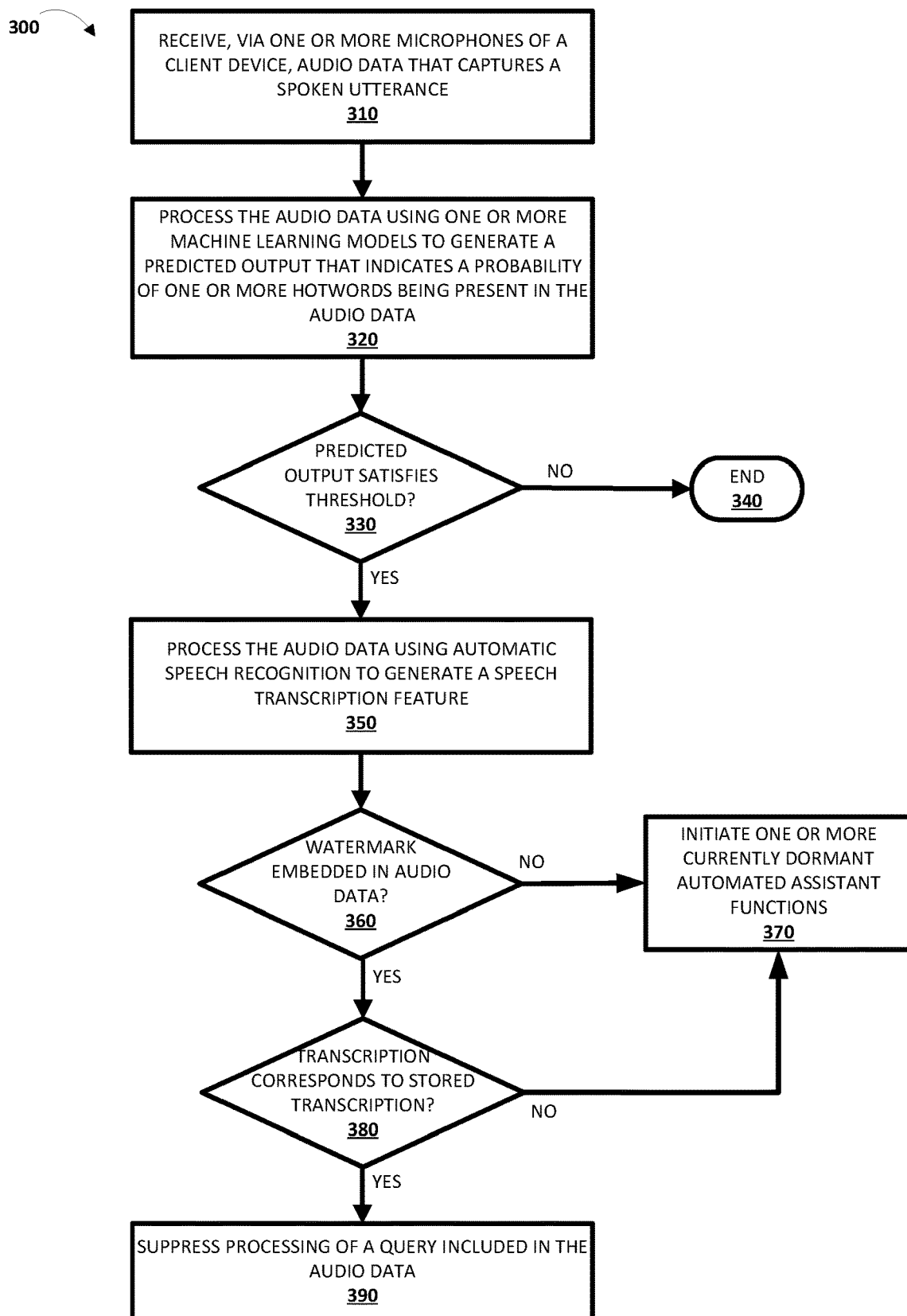
FIG. 3 depicts a flowchart illustrating an example method of detecting media content and, in response, suppressing processing of a query included in audio data of the media content, in accordance with various implementations.

FIG. 3 depicts a flowchart illustrating an example method 300 of detecting media content and, in response, suppressing processing of a query included in audio data of the media content. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 310, the system receives, via one or more microphones of a client device, audio data that captures a spoken utterance.

At block 320, the system processes the audio data received at block 310 using one or more machine learning models to generate a predicted output that indicates a probability of one or more hotwords being present in the audio data. The one or more machine learning models can be, for example, on-device hotword detection models and/or other machine learning models. Each of the machine learning models may be a deep neural network or any other type of model and may be trained to recognize one or more hotwords. Further, the generated output can be, for example, a probability and/or other likelihood measures.

At block 330, the system determines whether or not the predicted output generated at block 320 satisfies a threshold that is indicative of the one or more hotwords being present in the audio data. If, at an iteration of block 330, the system determines that the predicted output generated at block 320 does not satisfy the threshold, then the system proceeds to block 340, and the flow ends. On the other hand, if, at an iteration of block 330, the system determines that the predicted output generated at block 320 satisfies the threshold, then the system proceeds to block 350.

Still referring to block 330, in an example, assume the predicted output, generated at block 320, is a probability and the probability must be greater than 0.85 to satisfy the threshold at block 330, and the predicted probability is 0.88. Based on the predicted probability of 0.88 satisfying the threshold of 0.85, the system proceeds to block 350.

At block 350, in response to determining that the predicted output satisfies the threshold at block 330, the system processes the audio data received at block 310 using automatic speech recognition to generate a speech transcription feature or intermediate embedding. In some implementations, the system generates a speech transcription feature that is a transcript of speech that is captured in the audio data. In other implementations, the system generates an intermediate embedding that is an acoustic-based signal derived from the ASR engine, based on the audio data.

Still referring to block 350, in other implementations, in response to determining that the predicted output satisfies the threshold at block 330, the system further processes the audio data using speaker identification techniques to determine a speaker vector corresponding to the query included in the audio data.

At block 360, in response to determining that the predicted output satisfies the threshold at block 330, the system determines whether or not a watermark is embedded in the audio data received at block 310. In some implementations, the watermark is an audio watermark that is imperceptible to humans. If, at an iteration of block 360, the system does not detect a watermark embedded in the audio data, then the system proceeds to block 370 and initiates one or more currently dormant automated assistant functions. In some implementations, the one or more automated assistant functions include speech recognition to generate recognized text, natural language understanding (NLU) to generate NLU output, generating a response based on the recognized text (e.g., from block 350) and/or the NLU output, transmission of the audio data to a remote server, transmission of the recognized text to the remote server, and/or directly triggering one or more actions that are responsive to the first audio data (e.g., a common task such as changing the device volume). On the other hand, if, at an iteration of block 360, the system detects a watermark embedded in the audio data, then the system proceeds to block 380.

At block 380, the system determines whether or not the speech transcription feature or intermediate embedding generated at block 350 corresponds to one of a plurality of stored speech transcription features or intermediate embeddings. In some implementations, the plurality of stored speech transcription features or intermediate embeddings is stored on the client device and includes a set of fuzzy speech transcriptions (e.g., erroneous transcriptions) for matching with the speech transcription that allows for errors and inexactitudes in the automatic speech recognition process. In some implementations, determining whether or not the speech transcription feature or intermediate embedding corresponds to one of the plurality of stored speech transcription features or intermediate embeddings includes determining that an edit distance between the speech transcription feature and one of the plurality of stored speech transcription features satisfies a threshold edit distance. In other implementations, determining that the speech transcription feature or intermediate embedding corresponds to one of the plurality of stored speech transcription features or intermediate embeddings includes determining that an embedding-based distance satisfies a threshold embedding-based distance. The embedding-based distance may be determined based on individual terms in a query included in the audio data or based on the entirety of the query included in the audio data.

If, at an iteration of block 380, the system determines that the speech transcription feature or intermediate embedding does not correspond to one of a plurality of stored speech transcription features or intermediate embeddings, then the watermark is not validated, and the system proceeds to block 370 and initiates one or more currently dormant automated assistant functions. In some implementations, the one or more automated assistant functions include speech recognition to generate recognized text or intermediate acoustic features (e.g., embeddings from the ASR engine), natural language understanding (NLU) to generate NLU output, generating a response based on the recognized text and/or the NLU output, transmission of the audio data to a remote server, transmission of the recognized text to the remote server, and/or directly triggering one or more actions that are responsive to the first audio data (e.g., a common task such as changing the device volume). On the other hand, if, at an iteration of block 380, the system determines that the speech transcription feature or intermediate embedding corresponds to one of a plurality of stored speech transcription features or intermediate embeddings, then the watermark is validated, and the system proceeds to block 390.

Still referring to block 380, in other implementations, the system determines whether or not the speaker vector generated at block 370 corresponds to one of a plurality of stored speaker vectors. If, at an iteration of block 380, the system determines that the speaker vector does not correspond to one of a plurality of stored speaker vectors, then the system proceeds to block 370 and initiates one or more currently dormant automated assistant functions. On the other hand, if, at an iteration of block 380, the system determines that the speaker vector corresponds to one of a plurality of stored speaker vectors, then the watermark is validated, the system proceeds to block 390.

In some implementations, the system can use one or more of the speech transcription features, the speaker vector, and any other stored factors (e.g., a date and/or time window in which the watermark is known to be active) to validate the watermark, as described above. If all of the factors are successfully matched (e.g., the speech transcription corresponds to a stored speech transcription, the speaker vector corresponds to a stored speaker vector, a current time falls within a stored time window in which the watermark is known to be active, etc.), then the watermark is validated, and the system proceeds to block 390. On the other hand, if one or more of the factors is not successfully matched, then the watermark is not validated, and the system proceeds to block 370.

At block 390, in response to determining that the speech transcription feature corresponds to one of the plurality of stored speech transcription features or otherwise validating the watermark at block 380 (e.g., by determining that the speaker vector corresponds to one of the plurality of stored speaker vectors or by determining that a current date and/or time falls within a stored date and/or time window in which the watermark is known to be active), the system suppresses processing of a query included in the audio data received at block 310.

Figure 4:
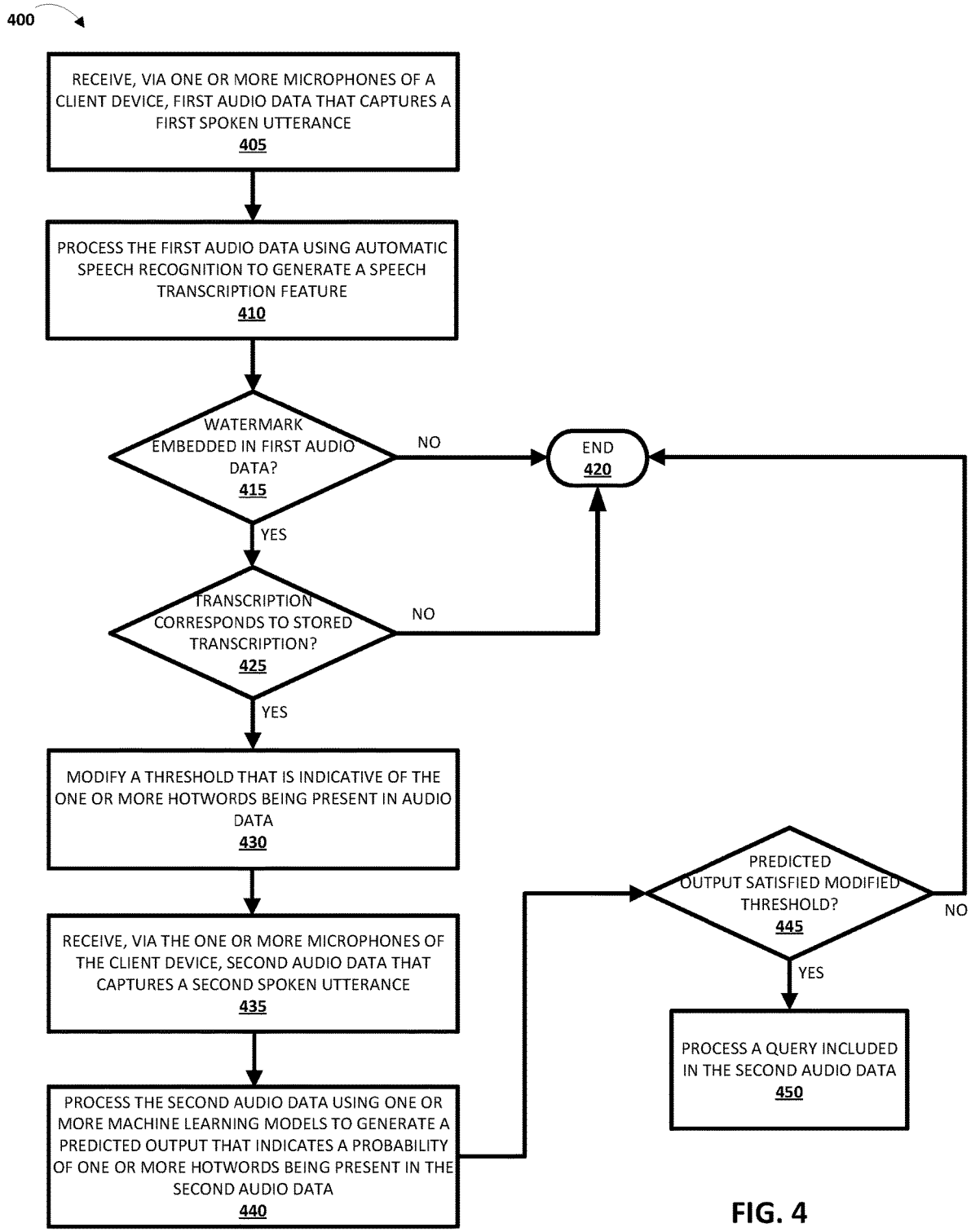
FIG. 4 depicts a flowchart illustrating an example method of detecting media content and, in response, adapting hotword detection and/or automatic speech recognition, in accordance with various implementations.

FIG. 4 depicts a flowchart illustrating an example method 400 of detecting media content and, in response, adapting hotword detection and/or automatic speech recognition. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 405, the system receives, via one or more microphones of a client device, first audio data that captures a first spoken utterance.

At block 410, the system processes the first audio data received at block 405 using automatic speech recognition to generate a speech transcription feature or intermediate embedding. In some implementations, the system generates a speech transcription feature that is a transcript of speech that is captured in the first audio data. In other implementations, the system generates an intermediate embedding that is an acoustic-based signal derived from the ASR engine, based on the first audio data.

Still referring to block 410, in other implementations, the system further processes the audio data using speaker identification techniques to determine a speaker vector corresponding to the query included in the audio data.

At block 415, the system determines whether or not a watermark is embedded in the first audio data received at block 405. In some implementations, the watermark is an audio watermark that is imperceptible to humans. If, at an iteration of block 415, the system does not detect a watermark embedded in the first audio data, then the system proceeds to block 420 and the flow ends. On the other hand, if, at an iteration of block 415, the system detects a watermark embedded in the first audio data, then the system proceeds to block 425.

At block 425, the system determines whether or not the speech transcription feature or intermediate embedding generated at block 410 corresponds to one of a plurality of stored speech transcription features or intermediate embeddings. In some implementations, the plurality of stored speech transcription features or intermediate embeddings is stored on the client device and includes a set of fuzzy speech transcriptions (e.g., erroneous transcriptions) for matching with the speech transcription that allows for errors and inexactitudes in the automatic speech recognition process. In some implementations, determining whether or not the speech transcription feature or intermediate embedding corresponds to one of the plurality of stored speech transcription features or intermediate embeddings includes determining that an edit distance between the speech transcription feature and one of the plurality of stored speech transcription features satisfies a threshold edit distance. In other implementations, determining that the speech transcription feature or intermediate embedding corresponds to one of the plurality of stored speech transcription features or intermediate embeddings includes determining that an embedding-based distance satisfies a threshold embedding-based distance. The embedding-based distance may be determined based on individual terms in a query included in the audio data or based on the entirety of the query included in the audio data.

If, at an iteration of block 425, the system determines that the speech transcription feature or intermediate embedding does not correspond to one of a plurality of stored speech transcription features or intermediate embeddings, then the watermark is not validated, and the system proceeds to block 420 and the flow ends. On the other hand, if, at an iteration of block 425, the system determines that the speech transcription feature or intermediate embedding corresponds to one of a plurality of stored speech transcription features or intermediate embeddings, then the watermark is validated, and the system proceeds to block 430.

Still referring to block 425, in other implementations, the system determines whether or not the speaker vector generated at block 410 corresponds to one of a plurality of stored speaker vectors. If, at an iteration of block 425, the system determines that the speaker vector does not correspond to one of a plurality of stored speaker vectors, then the system proceeds to block 420 and the flow ends. On the other hand, if, at an iteration of block 425, the system determines that the speaker vector corresponds to one of a plurality of stored speaker vectors, then the watermark is validated, the system proceeds to block 430.

In some implementations, the system can use one or more of the speech transcription features, the intermediate embeddings, the speaker vector, and any other stored factors (e.g., a date and/or time window in which the watermark is known to be active) to validate the watermark, as described above. If all of the factors are successfully matched (e.g., the speech transcription corresponds to a stored speech transcription, the speaker vector corresponds to a stored speaker vector, a current date and/or time falls within a stored date and/or time window in which the watermark is known to be active, etc.), then the watermark is validated, and the system proceeds to block 430. On the other hand, if one or more of the factors is not successfully matched, then the watermark is not validated, and the system proceeds to block 420, and the flow ends.

In other implementations, the system may validate the watermark and proceed to block 430 if any one factor is successfully matched or if a predetermined fraction of the factors are successfully matched. In other implementations, the system may validate the watermark and proceed to block 430 based upon a weighted combination of confidence scores generated based on the stored factors.

At block 430, in response to determining that the speech transcription feature or intermediate embedding corresponds to one of the plurality of stored speech transcription features or intermediate embeddings or otherwise validating the watermark at block 425 (e.g., by determining that the speaker vector corresponds to one of the plurality of stored speaker vectors or by determining that a current date and/or time falls within a stored date and/or time window in which the watermark is known to be active), the system modifies a threshold that is indicative of the one or more hotwords being present in audio data.

At block 435, the system receives, via the one or more microphones of the client device, second audio data that captures a second spoken utterance.

At block 440, the system processes the second audio data received at block 435 using one or more machine learning models to generate a predicted output that indicates a probability of one or more hotwords being present in the second audio data. The one or more machine learning models can be, for example, on-device hotword detection models and/or other machine learning models. Each of the machine learning models may be a deep neural network or any other type of model and may be trained to recognize one or more hotwords. Further, the generated output can be, for example, a probability and/or other likelihood measures.

At block 445, the system determines whether or not the predicted output generated at block 440 satisfies the modified threshold (from block 430) that is indicative of the one or more hotwords being present in the second audio data. If, at an iteration of block 445, the system determines that the predicted output generated at block 440 does not satisfy the modified threshold, then the system proceeds to block 420, and the flow ends. On the other hand, if, at an iteration of block 445, the system determines that the predicted output generated at block 440 satisfies the modified threshold, then the system proceeds to block 450.

Still referring to block 445, in an example, assume the predicted output, generated at block 440, is a probability and the probability must be greater than 0.75 to satisfy the modified threshold at block 445, and the predicted probability is 0.78. Based on the predicted probability of 0.78 satisfying the threshold of 0.75, the system proceeds to block 450.

At block 450, in response to determining that the predicted output satisfies the modified threshold, the system processes a query included in the second audio data. For example, as a result of processing the query, the system may initiate one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the first audio data (e.g., a common task such as changing the device volume).

Figure 5:
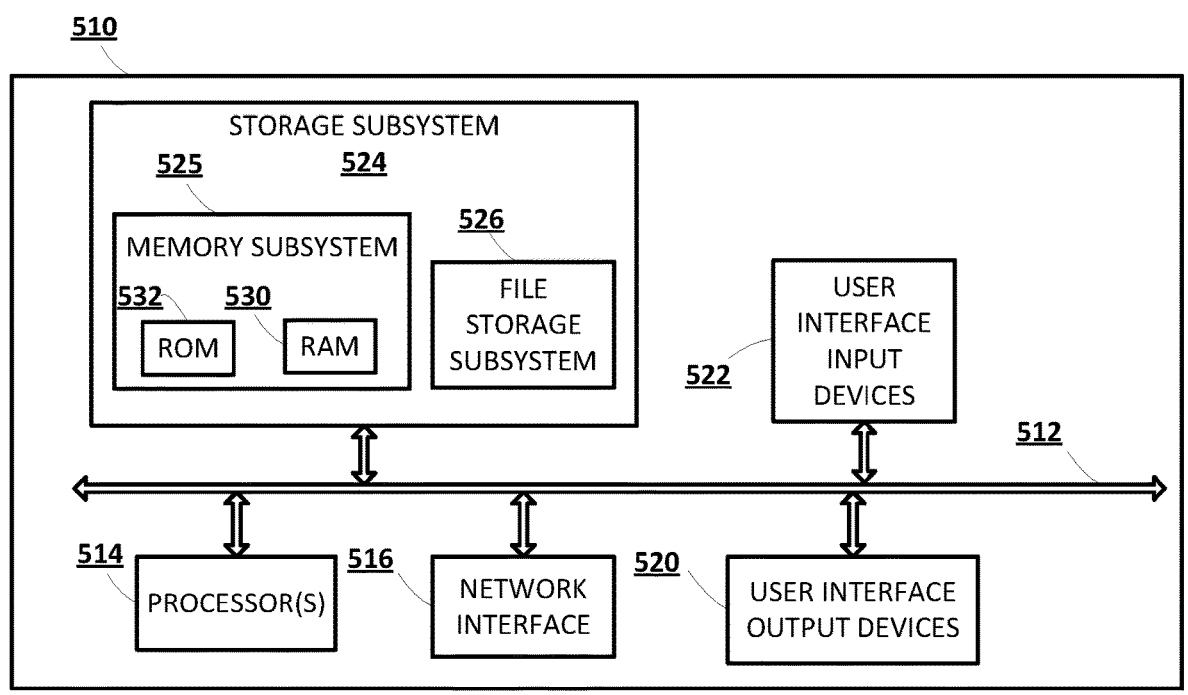
FIG. 5 depicts an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 1B.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    inserting, into an audio track of media content, at a particular point in the audio track, a particular watermark, wherein the particular point in the audio track is a temporal location in the audio track that is prior to, concurrent with, or subsequent to a hotword or query in the audio track;
    determining, based on the audio track of the media content, watermark registration data comprising a plurality of features, the plurality of features including (i) an indication of the particular watermark that was inserted into the audio track and (ii) a speech transcription feature or intermediate embedding that is associated with the particular watermark; and
    providing, to a client device, the watermark registration data associated with the audio track of the media content, wherein providing the watermark registration data associated with the audio track of the media content to the client device causes the client device to:
        store, locally at the client device, the watermark registration data;
        detect audio data, via one or more microphones of the client device, corresponding to the audio track of the media content;
        determine, based on processing the audio data, that the audio data includes the particular watermark included in the watermark registration data that is stored locally at the client device; and
        in response to determining that the audio data includes the particular watermark included in the watermark registration data that is stored locally at the client device:
            determine, based on processing the audio data, that the audio data includes the speech transcription feature or the intermediate embedding that is associated with the particular watermark included in the watermark registration data that is stored locally at the client device; and
            in response to determining that the audio data includes the speech transcription feature or the intermediate embedding that is associated with the particular watermark:
                suppress, based on detecting the audio data that includes the particular watermark and that includes the speech transcription feature or the intermediate embedding that is associated with the particular watermark, processing of the hotword or the query in the audio track.

2. The method according to claim 1, wherein providing the watermark registration data associated with the audio track of the media content to the client device further causes the client device to modify a threshold that is indicative of one or more hotwords being present in audio data.

3. The method according to claim 1, further comprising causing the watermark registration data to be stored on a cloud computing node, wherein providing the watermark registration data to the client device comprises the cloud computing node providing the watermark registration data to the client device.

4. The method according to claim 1, wherein the particular watermark is an audio watermark that is imperceptible to humans.

5. The method according to claim 1, wherein the speech transcription feature or intermediate embedding that is associated with the particular watermark corresponds to the particular point in the audio track where the particular watermark was inserted.

6. The method according to claim 1, wherein the speech transcription feature or intermediate embedding that is associated with the particular watermark includes erroneous transcriptions.

7. A computer program product comprising one or more non-transitory computer-readable storage media having program instructions collectively stored on the one or more non-transitory computer-readable storage media, the program instructions executable to:
  insert, into an audio track of media content, at a particular point in the audio track, a particular watermark, wherein the particular point in the audio track is a temporal location in the audio track that is prior to, concurrent with, or subsequent to a hotword or query in the audio track;
  determine, based on the audio track of the media content, watermark registration data comprising a plurality of features, the plurality of features including (i) an indication of the particular watermark that was inserted into the audio track and (ii) a speech transcription feature or intermediate embedding that is associated with the particular watermark; and
  provide, to a client device, the watermark registration data associated with the audio track of the media content, wherein the instructions to provide the watermark registration data associated with the audio track of the media content to the client device cause the client device to:
    store, locally at the client device, the watermark registration data;
    detect audio data, via one or more microphones of the client device, corresponding to the audio track of the media content;
    determine, based on processing the audio data, that the audio data includes the particular watermark included in the watermark registration data that is stored locally at the client device; and
    in response to determining that the audio data includes the particular watermark included in the watermark registration data that is stored locally at the client device:
      determine, based on processing the audio data, that the audio data includes the speech transcription feature or the intermediate embedding that is associated with the particular watermark included in the watermark registration data that is stored locally at the client device; and
      in response to determining that the audio data includes the speech transcription feature or the intermediate embedding that is associated with the particular watermark:
        suppress, based on detecting the audio data that includes the particular watermark and that includes the speech transcription feature or the intermediate embedding that is associated with the particular watermark, processing of the hotword or the query in the audio track.

8. The computer program product according to claim 7, wherein the instructions to provide the watermark registration data associated with the audio track of the media content to the client device further causes the client device to modify a threshold that is indicative of one or more hotwords being present in audio data.

9. The computer program product according to claim 7, wherein:
  the program instructions are further executable to cause the watermark registration data to be stored on a cloud computing node; and
  providing the watermark registration data to the client device comprises the cloud computing node providing the watermark registration data to the client device.

10. The computer program product according to claim 7, wherein the particular watermark is an audio watermark that is imperceptible to humans.

11. The computer program product according to claim 7, wherein the speech transcription feature or intermediate embedding that is associated with the particular watermark corresponds to the particular point in the audio track where the particular watermark was inserted.

12. The computer program product according to claim 7, wherein the speech transcription feature or intermediate embedding that is associated with the particular watermark includes erroneous transcriptions.

13. A system comprising:
  a processor, a computer-readable memory, one or more computer-readable storage media, and program instructions collectively stored on the one or more computer-readable storage media, the program instructions executable to:
  insert, into an audio track of media content, at a particular point in the audio track, a particular watermark, wherein the particular point in the audio track is a temporal location in the audio track that is prior to, concurrent with, or subsequent to a hotword or query in the audio track;
  determine, based on the audio track of the media content, watermark registration data comprising a plurality of features, the plurality of features including (i) an indication of the particular watermark that was inserted into the audio track and (ii) a speech transcription feature or intermediate embedding that is associated with the particular watermark; and
  provide, to a client device, the watermark registration data associated with the audio track of the media content, wherein the instructions to provide the watermark registration data associated with the audio track of the media content to the client device cause the client device to:
    store, locally at the client device, the watermark registration data;
    detect audio data, via one or more microphones of the client device, corresponding to the audio track of the media content;
    determine, based on processing the audio data, that the audio data includes the particular watermark included in the watermark registration data that is stored locally at the client device; and
    in response to determining that the audio data includes the particular watermark included in the watermark registration data that is stored locally at the client device:

determine, based on processing the audio data, that the audio data includes the speech transcription feature or the intermediate embedding that is associated with the particular watermark included in the watermark registration data that is stored locally at the client device; and in response to determining that the audio data includes the speech transcription feature or the intermediate embedding that is associated with the particular watermark:

suppress, based on detecting the audio data that includes the particular watermark and that includes the speech transcription feature or the intermediate embedding that is associated with the particular watermark, processing of the hotword or the query in the audio track.

14. The system according to claim 13, wherein the instructions to provide the watermark registration data associated with the audio track of the media content to the client device further causes the client device to modify a threshold that is indicative of one or more hotwords being present in audio data.

* * * * *